United States Patent

[11] 3,567,937

[72] Inventor Yoshimasa Murayama
 Hachioji-shi, Japan
[21] Appl. No. 645,658
[22] Filed June 13, 1967
[45] Patented Mar. 2, 1971
[73] Assignee Hitachi, Ltd.
 Tokyo, Japan
[32] Priority June 27, 1966
[33] Japan
[31] 41/4137

[54] METHOD AND APPARATUS FOR DETERMINING THE MASS OF MICROFINE PARTICLES
 4 Claims, 2 Drawing Figs.
[52] U.S. Cl.................................................. 250/83.3,
 250/83
[51] Int. Cl................................................... G01t 1/16
[50] Field of Search...................................... 250/83,
 83.3, 84

[56] References Cited
 UNITED STATES PATENTS
 3,404,277 10/1968 Jerko............................ 250/106
 3,193,683 7/1965 Reiffel.......................... 250/83X
 3,257,558 6/1966 Cook et al..................... 250/84X

OTHER REFERENCES

Optical Method for Absolute Velocity Calibration of Mossbauer Spectrometers, by de Waard, from the Review of Scientific Instruments, Vol. 36, No. 12, Dec. 1965, pp. 1728–1733.

Using The Mossbauer Effect, by V. I. Goldanskii, from International Science and Technology, December 1963, pgs. 40-–48

*Primary Examiner*—Archie R. Borchelt
*Attorney*—Craig, Antonelli, Stewart & Hill ABSTRACT: A method and an apparatus for determining the mass of a particle by making use of resonance absorption of $\gamma$-ray. An emission and absorption of $\gamma$-ray is caused between nuclei of the same kind contained in both a microfine particle and a solid body which are in relative motion; the recoil energy of the particle which recoils inversely proportionally to its mass at the time of the emission and absorption of $\gamma$-ray is compensated for by the said relative motion to cause resonance absorption. The mass of the particle is determined from the relative velocity.

PATENTED MAR 2 1971    3,567,937

INVENTOR
YOSHIMASA MURAYAMA

BY Paul M. Craig, Jr.
ATTORNEY

METHOD AND APPARATUS FOR DETERMINING THE MASS OF MICROFINE PARTICLES

BACKGROUND OF THE INVENTION

1. Field of the Invention

The present invention relates to a method and an apparatus for measuring the masses of microfine particles, and more particularly to a method and an apparatus for determining the masses of the microfine particles from the recoil energy of the particles when they absorb γ-ray.

2. Description of the Prior Art

The masses of microfine particles are usually determined from their specific weights and their volumes estimated from images formed by an electron or optical microscope. However, an image formed by a microscope merely shows two dimensional shape and size, and hence the volumes of relatively few of the particles can exactly be estimated from the said image. Therefore, the determination of the masses of the particles by this method is inexact.

The masses of ionized particles can be determined by mass spectrometry. However, mass spectrometry is usually applied to volatile materials and the measurable mass range is up to about $10^3$ times as large as that of a hydrogen atom.

SUMMARY OF THE INVENTION

A primary object of the present invention is to provide a method and an apparatus for measuring the exact mass of a particle up to about $10^7 - 10^{10}$ times as large as that of a hydrogen atom. The present invention is characterized in that the mass of a microfine particle is determined from a recoil caused when it absorbs γ-ray. The mass of the recoiled particle is determined from the velocity of the particle relative to the γ-ray source which compensates for the recoil.

BRIEF DESCRIPTION OF THE DRAWINGS

The principle, construction and advantages of the present invention will become apparent from the following description of the invention with reference to the attached drawings, in which.

DESCRIPTION OF THE PREFERRED EMBODIMENT

Figure 1:
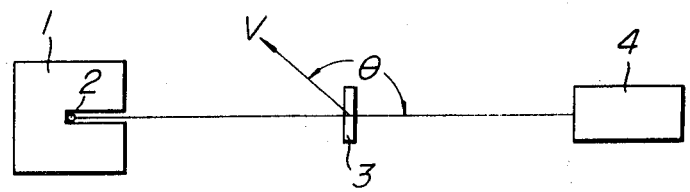
FIG. 1 is a schematic diagram explaining an embodiment of the present invention.

As is well known, an atomic nucleus has energy levels corresponding to various excited states besides the ground state. When a transition is caused between these levels, the nucleus absorbs or emits γ-ray, and, at the same time, recoils. However, in a solid body in which each nucleus is tightly coupled with its neighboring nuclei through the intermediary of its surrounding electron cloud, what recoils is not the nucleus which absorbs or emits γ-ray, but the solid body which contains the nucleus. Therefore, when a nucleus emits γ-ray due to a transition between levels, the energy difference between which is $E_o$, a particle of mass $M$ containing the nucleus recoils with a velocity $v$ from a rest state. Assuming that the energy of the emitted γ-ray is $E_e$, the following relations hold from the conservations of momentum and energy:

$$Mv + \frac{E_e}{c} = 0, \quad E_0 = E_e + \frac{Mv^2}{2}$$

where $c$ represents the velocity of light. From these formulas, $$E_o - E_e = \frac{Mv^2}{2} = \frac{E_e^2}{2Mc^2} \doteq \frac{E_o^2}{2Mc^2}$$

follows. Thus, the energy of γ-ray is smaller than the energy difference between the levels by $E_o^2/2Mc^2$, this decrement being the recoil energy of the particle. The recoil energy is inversely proportional to the mass of the particle. Therefore, the recoil energy of a particle having a sufficiently large mass is substantially zero, and the radiated γ-ray energy becomes equal to the difference between the energy levels. Inversely, when a particle is irradiated by γ-ray of an energy $E_a$ and a nucleus in the particle is excited between energy levels having an energy difference $E_o$ by absorbing the γ-ray, the particle also recoils with an energy $$E_a - E_o \doteq \frac{E_o^2}{2Mc^2},$$

and hence the energy of the irradiating γ-ray must be larger than the excitation energy by this amount. However, similar to the case of the above-mentioned γ-ray emission, when the mass of the particle is sufficiently large, the particle does not substantially recoil and hence the irradiation energy and the excitation energy are equal.

It is called the Moessbauer effect to cause γ-ray emission and resonance absorption between two particles containing nuclei of the same kind in a state that the masses of the particles are sufficiently large and hence the energy of the emitted or absorbed γ-ray is equal to the energy difference between levels participating in the emission or absorption, or, in other words, in a state of no recoil. Usually, this effect is widely utilized to investigate various fine structures of nuclear levels due to the interaction between the nucleus and its neighboring electrons.

In contrast to this, in the present invention, the mass of a recoiled particle is determined by causing a nucleus in the recoiled microfine particle to perform resonance absorption of γ-ray.

Now, an example utilizing a transition between the levels of $^{57}Fe$ will be described. After a β-decay, radioactive $^{57}Co$ transforms into stable $^{57}Fe$ via $^{57}Fe$ in excited states, at which time γ-ray having an energy of 14.36 kev. is emitted due to a transition between the ground state and the next excited state. If this energy of γ-ray is emitted by, for example, a body of stainless steel of sufficiently large mass containing $^{57}Co$, this energy represents the energy difference between the levels as has already been described.

In measuring the mass of a particle, a body which contains $^{57}Co$ is employed as a γ-ray source, and a small amount of stable $^{57}Fe$ is incorporated in the particle the mass of which is to be determined. Referring to FIG. 1, γ-rays from the source 2 disposed in a recess of a protector 1 are directed to particles of mass $M$ carried by a suspender 3, at which time the particles are moved with a velocity of $V$ in a direction of an angle of $$\theta \left( \pi \geq \theta > \frac{\pi}{2} \right)$$

relative to the path of the γ-ray. A counter 4 is arranged behind the particles and in the path of the γ-rays to measure the dose of the γ-rays.

Assuming that the energy of the γ-ray from the source is $E$, the energy absorbed by the particle is $E_o$, and the component of the velocity of the recoiled particle in the direction of the path of the γ-ray is $v$, it follows from the laws of conservations of momentum and energy that $$MV \cos \theta + \frac{E}{c} = M(V \cos \theta + v)$$

$$E + \frac{MV^2}{2} = E_o + \frac{M}{2}[(V \sin \theta)^2 + (V \cos \theta + v)^2]$$

From these formulas the relation $$\frac{E - E_0}{E_0} \doteq \frac{V \cos \theta}{c} + \frac{E}{2Mc^2}$$

results.

In the above, since the energy $E$ is the energy of γ-ray emitted when a transition is made from an excited state to the ground state of $^{57}Fe$ without recoil, an acute resonance absorption occurs when $E = E_o$, that is, when $$\frac{V \cos \theta}{c} + \frac{E}{2Mc^2} = 0, \text{ so that } M = \frac{E}{2cV|\cos \theta|}$$

Therefore, by moving the particle with varying $V$ or $\Theta$, the mass $M$ of the particle can be known from the value of $V$ or $\Theta$ at the time of the occurrence of an acute γ-ray absorption. In other words, the resonance absorption occurs when the velocity of the particle is such that the component of the velocity in the direction of the path of the γ-ray is reversed after the particle has absorbed the γ-ray. Incidentally, in case a particle system having mass distribution absorbs γ-rays, there occurs a distribution of absorption peaks, from which the mass distribution corresponding thereto can be known.

Figure 2:
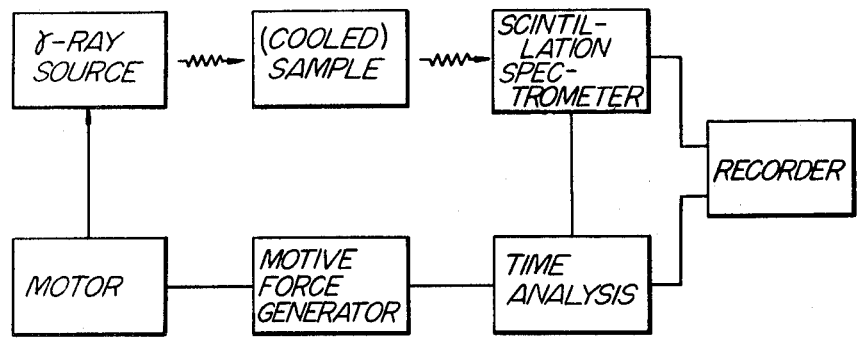
FIG. 2 is another arrangement for embodying the method of the present invention.

In the above example the resonance absorption was made with the reversal of the component of velocity in the direction of the path of γ-ray at the time of the absorption of γ-ray by the particle and without energy loss due to recoil. However, in case the energy $E$ of radiated γ-ray is increased by $EVs/c$ due to the Doppler effect by moving the source of γ-ray with a velocity of $Vs$ toward a rest particle of mass $M$, the resonance absorption occurs when the value $EVs/c$ is equal to the energy $E^2/2^2$ to be consumed by the particle for recoil. Therefore, it is also possible to determine the mass of a particle from the value of $Vs$ at which an acute peak of absorption occurs while measuring the absorption with varying $Vs$. In FIG. 2 is shown an example of the arrangement for recording absorption curves on a recorder, the abscissa thereof representing the velocity of the γ-ray source and the ordinate representing the intensity of γ-ray. The particle to be measured is maintained in a state easy to recoil by being surrounded with a soft binder or with a liquid as a suspension, and is cooled in order for the absorption peak to be rendered acute.

In the above two examples a particle contained a nucleus absorbing γ-ray. On the contrary, however, a nucleus which emits γ-ray can be incorporated in a particle to act as a γ-ray source. A body having a sufficiently large mass and containing a stable nucleus which absorbs γ-ray is employed as a body to be irradiated by the γ-ray. Then, the mass of the particle can be determined by finding the velocity at which resonance absorption occurs while varying the relative velocity between the γ-ray source and the body to be irradiated.

The recoil of a particle according to the present invention decreases as the mass of the particle increases, and becomes indetectable when the recoil energy $E^2/2Mc^2$ of the particle becomes of the same order as the natural width $\Gamma$ of γ-ray. Consequently the mass of the particle at this time is the limit to measurement. Since γ-ray having an energy of 14.36 kev. emitted by $^{57}$Fe in an excited state has a natural width $\Gamma$ of the order of $10^{-8}$ ev., the value of $M$ satisfying $$\Gamma = \frac{E^2}{2Mc^2}$$

i.e. $2\times 10^{-17}$g., constitutes the limit to measurement. This value corresponds to $10^7$ hydrogen atoms or an aggregate of $10^7/m$ atoms of substance having atomic weight $m$.

In case the resonance absorption of $^{67}$Zn is utilized, since γ-ray of 97 kev. emitted by $^{67}$Zn in an excited state has a natural width of $10^{-10}$ ev., particle mass up to $10^{-14}$g., i.e. corresponding to $10^{10}$ hydrogen atoms, can be measured.

For a precise detection of the resonance absorption according to the present invention it is important to control the above-mentioned relative velocity. By current technique the relative velocity can be controlled with an accuracy of 1 percent or lower.

When the absolute value of the relative velocity to be measured is so small as to make the measurement difficult, the shift from $E_o$ due to an internal magnetic or electric field sensed by a nucleus in a solid can be employed as a bias. A shift due to an interaction between an internal magnetic field or crystal field of $^{57}$Fe in a ferromagnetic or antiferromagnetic state and the quadrupole moment of an atomic nucleus is an example of such bias. In this case, since the difference between the measured relative velocity and the value of bias is the desired velocity, the accuracy of measurement is the same.

Hereinabove, although examples of γ-ray resonance absorption of $^{57}$Fe and $^{67}$Zn have been described, the determination of mass according to the present invention can also be effected by employing other nuclei which emit or absorb γ-rays.

As microfine particles the masses and mass distributions of which can be determined by the method of the present invention there are polymer compounds, precipitated microfine particles, colloids and the like.

Examples of the principle, arrangement, limit and field of application of the present invention have been described, but the present invention is not limited to these examples. It is apparent to those skilled in the art that various changes and modifications can be made without departing from the spirit and scope of the invention.

I claim:

1. An apparatus for determining the mass of a microfine particle comprising:
    a first body containing atomic nuclei capable of emitting and absorbing γ-rays, said body being in a massive state so as to emit or absorb said γ-rays without recoil;
    at least one microfine sample body containing atomic nuclei of the same kind as said nuclei of said first body;
    means for sustaining said sample body in such a state as to easily recoil at the absorption and emission of said γ-rays;
    means for detecting said γ-ray emitted from one of said bodies and passing through the other body;
    means for causing relative motion between said bodies in said beam path to compensate for the recoil energy loss of said sample body inversely proportional to the mass thereof for causing the resonance absorption of said γ-ray in said other body; and
    means for measuring said relative motion, whereby said mass is determined from the velocity of said motion at which said resonance absorption occurs.

2. A method for determining the mass of a microfine particle comprising the steps of:
    preparing at least one microfine sample body containing atomic nuclei capable of emitting or absorbing γ-rays and a massive body containing the same kind of nuclei as said nuclei;
    sustaining said sample body in such a fashion that the recoil thereof occurs easily at the emission or absorption of said γ-ray;
    disposing said sample body, said massive body and a γ-ray detector in such a manner that γ-rays emitted from one of said bodies and passing through the other thereof are directed to said detector; and
    measuring the relative motion caused between said two bodies in said beam path to compensate for the recoil energy loss of said sample body inversely proportional to the mass thereof for causing the resonance absorption of said γ-rays in said other body; whereby said mass is determined from said relative motion at which said resonance absorption occurs.

3. A method according to claim 2, wherein said two bodies and said γ-ray detector are aligned on the same line.

4. A method for determining the mass distribution of microfine particles comprising the steps of:
    preparing microfine sample bodies containing atomic nuclei capable of emitting or absorbing γ-rays and a massive body containing the same kind of nuclei as said nuclei of said sample bodies;
    sustaining said sample bodies in such a fashion that the recoils thereof occur easily upon the emission or absorption of said γ-ray;
    disposing said sample bodies, said massive body and a γ-ray detector in such a manner that γ-rays emitted from one of said sample bodies and said massive body and passing through the other thereof are directed to said detector; and
    measuring the relative motion caused between said massive body and said sample bodies in said beam path in a wide motion range so as to compensate the recoil energy losses of said sample bodies inversely proportional to each mass thereof for causing respective resonance absorptions of said γ-rays in said other body; whereby said mass distribution is determined from the distribution of said resonance absorption of said relative motion in said range.

UNITED STATES PATENT OFFICE
CERTIFICATE OF CORRECTION

Patent No. 3,567,937                    Dated   March 2, 1971

Inventor(s) Yoshimasa Murayama

It is certified that error appears in the above-identified patent and that said Letters Patent are hereby corrected as shown below:

Title page, left-hand column, which now reads: (at item 31)

41/4137 should read:

41/41371

Signed and sealed this 25th day of July 1972.

(SEAL)
Attest:

EDWARD M. FLETCHER, JR.              ROBERT GOTTSCHALK
Attesting Officer                    Commissioner of Patents